United States Patent [19]

Coleman et al.

[11] 4,448,913

[45] May 15, 1984

[54] FAST CRYSTALLIZING POLYETHYLENE TEREPHTHALATE COMPOSITIONS

[75] Inventors: Ernest A. Coleman, Stamford, Conn.; Kevin J. Cronin, Waldwick, N.J.; Frank K. Chu, Ramsey, N.J.; Robin W. Kirwan, West Milford, N.J.

[73] Assignee: Dart Industries Inc., Northbrook, Ill.

[21] Appl. No.: 437,651

[22] Filed: Oct. 29, 1982

[51] Int. Cl.³ .................. C08K 5/12; C08L 63/00; C08L 67/02
[52] U.S. Cl. .................. 523/455; 260/DIG. 35; 523/465; 524/396; 524/513
[58] Field of Search .............. 260/DIG. 35; 523/455, 523/465; 524/396, 513

[56] References Cited

U.S. PATENT DOCUMENTS

| | | | |
|---|---|---|---|
| 3,673,139 | 6/1972 | Hrach | 528/298 |
| 3,953,394 | 4/1976 | Fox et al. | 260/DIG. 35 |
| 4,098,845 | 7/1978 | Keck | 528/285 |
| 4,107,149 | 8/1978 | Bier et al. | 528/309.1 |
| 4,136,089 | 1/1979 | Bier et al. | 528/309.1 |
| 4,184,026 | 1/1980 | Carrock et al. | 260/DIG. 35 |
| 4,284,540 | 8/1981 | Iida et al. | 524/513 |
| 4,336,343 | 6/1982 | Aharoni | 523/455 |
| 4,341,690 | 7/1982 | Marsh | 524/513 |
| 4,344,874 | 8/1982 | Akagi et al. | 524/396 |

FOREIGN PATENT DOCUMENTS

897843  4/1972  Canada .................. 524/396

*Primary Examiner*—Ronald W. Griffin
*Attorney, Agent, or Firm*—Bryant W. Brennan; Leigh B. Taylor

[57] ABSTRACT

Polyethylene terephthalate molding compositions characterized by rapid crystallization are provided by combining polyethylene terephthalate and a filler or reinforcing agent with a crystallization-rate promoter comprising sodium benzoate and a poly-alpha-olefin such as low density polyethylene. A flame retardant material is provided by the addition of flame retardant additives.

12 Claims, No Drawings

FAST CRYSTALLIZING POLYETHYLENE TEREPHTHALATE COMPOSITIONS

BACKGROUND OF THE INVENTION

Polyethylene terephthalate and copolymers thereof are characterized by excellent physical properties which make them materials of great interest for use in films, fibers and molding applications. Reinforcing materials such as glass fibers are frequently incorporated in order to improve the mechanical properties of the final products prepared from polyethylene terephthalate.

It has been found, however, that the relatively slow rate of crystallization of polyethylene terephthalate and the copolymers thereof greatly limits the use of such polyester composition in injection molding processes. Hence, a great deal of effort has been expended on the discovery of promoters which will accelerate the crystallization rate of polyethylene terephthalate and of its copolymers. Among the various patents which have issued on the accelerations of polyethylene terephthalate and which discuss the efforts of the prior art to overcome the crystallization rate disadvantages of these polyesters there may be mentioned U.S. Pat. Nos. 3,673,139; 4,098,845; 4,107,149; and 4,136,089. In addition, mention can be made of British Pat. No. 1,505,599 and German Pat. Nos. 2,545,720; 2,653,120; 2,706,123; 2,706,124; and 2,706,128. As is evident from these aforementioned patents, the efforts of the prior art have concentrated on the development of specific additives or promoters which will enhance the crystallization rates of polyethylene terephthalate homopolymers and copolymers. However, the rigorous demands of injection molding procedures and the economic factors involved in this field of technology are such that the provision of further means for enhancing the crystallization rates of such polyesters is constantly encouraged.

SUMMARY OF THE INVENTION

It has been found in accordance with the present invention that the crystallization rate of polyethylene terephthalate homopolymers and copolymers per se and in molding compositions containing these polyesters can be improved by the addition of a poly-alpha olefin, particularly a low density polyethylene and sodium benzoate to polyethylene terephthalate and to compositions containing polyethylene terephthalate and its copolymers. While the use of sodium benzoate as a nucleating agent in crystalline thermoplastics is known, it has been found that the addition of a crystallization rate promoter is required when sodium benzoate is employed in slowly crystallizing resins such polyethylene terephthalates and its copolymers. In particular, it has been found in accordance with the present invention that when sodium benzoate and low density polyethylene are added to a composition of polyethylene and fiberglass and extrusion compounded, a rapidly crystallizable composition is obtained which is eminently suitable for injection molding procedures.

In addition, it has been found that a poly-alpha-olefin and sodium benzoate can be added to polyethylene terephthalate molding compositions containing flame retardant additives providing a flame retardant polyethylene terephthalate composition of satisfactory properties.

The compositions containing sodium benzoate, a poly-alpha-olefin, glass fibers and polyethylene terephthalate material can be prepared according to procedures known to those skilled in the art. However, it has been found most advantageous to dry blend the materials and extrude the resulting blend in order to mix and pelletize the blended composition.

DETAILED DESCRIPTION OF THE INVENTION

In accordance with the present invention, it has been found that the combination of low density polyethylene and sodium benzoate provides an effective promoter of the crystallization rate of polyethylene terephthalate and its copolymers thereby rendering polyethylene terephthalates utilizable over a wider range of conditions and applications. The combination can be added to the polyethylene terephthalate at concentrations of from about 0.05% to about 0.5% of sodium benzoate and from about 1.5% to about 4.0% of a poly-alpha-olefin by weight of the total composition. However, it is preferred to add the sodium benzoate in amounts of from about 0.1% to about 0.3% and the poly-alpha-olefin in the amount of from about 2.0% to about 3.5%.

The poly-alpha-olefin and the sodium benzoate can be added per se to a polyethylene terephthalate composition. Alternatively, a concentrate of these substances in polyethylene terephthalate can be prepared and added to polyethylene terephthalate compositions in an amount calculated to give the desired concentration in the final admixture.

Preferably, the poly-alpha-olefin is added as a finely divided powder but pelletized poly-alpha-olefin can also be used.

In the preparation of flame retardant polyethylene terephthalates, the generally known flame retardant additives, such as antimony trioxide in combination with halogenated organic compounds, can be employed in the proportions recognized as appropriate in the art. Specific halogenated organic compounds are Pyro-Chek 77PB, Pyro-Chek 68PB and Pyro-Chek 69PB.

Other additives, including impact modifiers, such as copolyester polyether thermoplastic elastomers can also be employed in the composition of this invention.

In the general practice of the invention, the compounding of the ingredients is effected by extrusion. However, other means of compounding will suggest themselves to those skilled in the art and are within the comprehension of the present invention.

In the following examples components identified by trade names are chemically identified as follows:

Epon 828—bisphenol A—epichlorohydrin condensate resin—Shell Chemical

Poly-Eth 1017—branched low density polyethylene (MI 20)—Gulf

Acrawax C—ethylene bis-stearamide—Glyco Chemicals

Hytrel 5556—copolyester elastomer—DuPont

Pyro-Chek 68PB—brominated organic flame retardant—Ferro Corporation

Thermogard CPA—proprietary antimony compound—M & T Chemicals

Vituf 5900—polyethylene terephthalate with I.V. of 0.59—Goodyear

Profax 6323—stabilized polypropylene (MFR 12)—Hercules

LLDPE—linear low density polyethylene GRSN 7042 (MI 2.0)—Union Carbide Corp.

PB0400—polybutylene homopolymer (MI 20)—Shell Chemical

AC617A—polyethylene homopolymer wax—Allied Chemical.

In all of the examples, the compounds were prepared in the following manner. The polyethylene terephthalate was pre-dried for at least four hours in a desiccating hopper dryer at 250° F. All other ingredients were added to the polyethylene terephthalate and thoroughly admixed. The admixtures were then extrusion compounded on a 1⅜" Killion extruder equipped with a two-stage 28:1 L/D screw and pelletized. The pelletized materials were then dried for a minimum of four hours at 250° F. in a circulating air tray drying oven. Table I lists typical extrusion conditions.

TABLE I

Typical Extrusion Compounding Conditions Temperature Settings

| Zone 1 | Zone 2 | Zone 3 | Zone 4 | Die 1 | Die 2 | Die 3 |
|---|---|---|---|---|---|---|
| 550° F. | 535° F. | 525° F. | 515° F. | 515° F. | 515° F. | 515° F. |
| Screw Speed: 90 rpm | | | | Melt Temp.: 530–545° F. | | |

The dried compounds were then injection molded on a 1 oz., 28 ton Arburg injection molding machine. A two cavity, parting line injection tool was used which had a ⅛"×5"×½" cavity (Standard ASTM flex bar) and a 3 mm×127 mm×12.7 mm cavity.

Table II identifies typical molding conditions used in the following examples.

TABLE II

Typical Molding Conditions (2 Cavity Flex Bar Mold) Temperature Settings

| Zone 1 | Zone 2 | Zone 3 | Mold |
|---|---|---|---|
| 270° C. | 280° C. | 290° C. | 125° C. |
| Injection Pressure: 350 psi | | Holding Pressure: 150 psi | |
| Cycle Time (Automatic Cycle, sec.) | | | |
| Delay Inject | Inject | Hold | Cooling | Die Open |
| 3.2 | 4.0 | 2.0 | 15.0 | 2.0 |

The following examples are intended only to illustrate the invention and are not to be construed as limiting the invention.

EXAMPLE 1

A molding composition is prepared by admixing the following ingredients in the following proportions:

| | Percent by Weight |
|---|---|
| Vituf 5900 | 65.9 |
| ⅛" Glass Fibers | 30.0 |
| Epon 828 | 1.0 |
| Sodium Benzoate | 0.1 |
| Poly-Eth 1017 | 3.0 |

When the above ingredients are thoroughly admixed, the mixture is extrusion compounded and molded according to the procedure previously outlined.

EXAMPLE 2

A molding composition is prepared and molded according to the procedure in Example 1 using the following ingredients in the following proportions:

| | Percent by Weight |
|---|---|
| Vituf 5900 | 55.55 |
| ⅛" Glass Fibers | 30.00 |
| Acrawax C | 0.50 |

-continued

| | Percent by Weight |
|---|---|
| Epon 828 | 0.75 |
| Sodium Benzoate | 0.20 |
| Poly-Eth 1017 | 3.00 |
| Hytrel 5556 | 10.00 |

The results of the test carried out on the flex bars made with formulations prepared in Examples 1 and 2 are set out in Table III below:

TABLE III

| | ASTM-D | Example 1 | Example 2 |
|---|---|---|---|
| Flexural Strength (× 10⁴ psi) | 790 | 3.48 | 2.99 |
| Flexural Modulus (× 10⁶ psi) | 790 | 1.46 | 1.21 |
| Unnotched Izod Impact (Ft-lb/in) | 256 | 13.1 | 15.6 |
| Notched Izod Impact (Ft-lb/in) | 256 | 2.1 | 2.4 |

EXAMPLE 3

A flame retardant molding composition is prepared and molded according to the procedure in Example 1 using the following ingredients in the following proportions:

| | Percent by Weight |
|---|---|
| Vituf 5900 | 50.6 |
| ⅛" Fiberglass | 30.0 |
| Epon 828 | 0.5 |
| Sodium Benzoate | 0.1 |
| Poly-Eth 1017 | 3.0 |
| Antimony Trioxide | 3.8 |
| Pyro-Chek 68PB | 11.5 |
| Acrawax C | 0.5 |

EXAMPLE 4

A flame retardant molding composition is prepared and molded according to the procedure in Example 1 using the following ingredients in the following proportions:

| | Percent by Weight |
|---|---|
| Vituf 5900 | 50.6 |
| ⅛" Fiberglass | 30.0 |
| Epon 828 | 0.5 |
| Sodium Benzoate | 0.1 |
| Poly-Eth 1017 | 3.0 |
| Thermogard CPA | 3.8 |
| Pyro-Chek 68PB | 11.5 |
| Acrawax C | 0.5 |

The results of the test carried out on the flex bars prepared from the compounds from Examples 3 and 4 are set out in Table IV below:

TABLE IV

| | ASTM-D | Example 3 | Example 4 |
|---|---|---|---|
| Flexural Strength (× 10⁴ psi) | 790 | 2.76 | 2.68 |
| Flexural Modulus (× 10⁶ psi) | 790 | 1.47 | 1.48 |
| Unnotched Izod Impact (Ft-lb/in) | 256 | 9.4 | 9.6 |
| Notched Izod Impact (Ft-lb/in) | 256 | 1.6 | 1.7 |

TABLE IV-continued

|  | ASTM-D | Example 3 | Example 4 |
| --- | --- | --- | --- |
| Flammability Rating |  | V-O* | V-O* |

*1/32" Samples meet V-0 requirements according to Underwriters Laboratories Standard UL-94.

EXAMPLE 5

A molding composition is prepared and molded according to the procedure in Example 1 using the following ingredients in the following proportions:

|  | Percent by Weight |
| --- | --- |
| Vituf 5900 | 65.4 |
| ⅛" Fiberglass | 30.0 |
| Epon 828 | 1.0 |
| Acrawax C | 0.5 |
| Sodium Benzoate | 0.1 |
| Profax 6323 | 3.0 |

The results of tests carried out on the flex bars prepared from the compound in Example 5 are set out in Table V below:

TABLE V

|  | ASTM-D | Example 5 |
| --- | --- | --- |
| Flexural Strength ($\times 10^4$ psi) | 790 | 3.29 |
| Flexural Modulus ($\times 10^6$ psi) | 790 | 1.32 |
| Unnotched Izod Impact (Ft-lb/in) | 256 | 13.6 |
| Notched Izod Impact (Ft-lb/in) | 256 | 1.8 |

EXAMPLE 6

A molding composition is prepared and molded according to the procedure in Example 1 using the following ingredients in the following proportions:

|  | Percent by Weight |
| --- | --- |
| Vituf 5900 | 65.55 |
| ⅛" Fiberglass | 30.00 |
| Epon 828 | 0.75 |
| Acrawax C | 0.50 |
| Sodium Benzoate | 0.20 |
| PB 0400 | 3.00 |
| Notched Izod (Ft-lb/in) | 1.8 |
| Unnotched Izod (Ft-lb/in) | 11.7 |

EXAMPLE 7

A molding composition is prepared and molded according to the procedure in Example 1 using the following ingredients in the following proportions:

|  | Percent by Weight |
| --- | --- |
| Vituf 5900 | 65.55 |
| ⅛" Fiberglass | 30.00 |
| Epon 828 | 0.75 |
| Acrawax C | 0.50 |
| Sodium Benzoate | 0.20 |
| LLDPE | 3.00 |
| Notched Izod (Ft-lb/in) | 1.8 |
| Unnotched Izod (Ft-lb/in) | 13.8 |

EXAMPLE 8

A molding composition is prepared and molded according to the procedure in Example 1 using the following ingredients in the following proportions:

|  | Percent by Weight |
| --- | --- |
| Vituf 5900 | 65.55 |
| ⅛" Fiberglass | 30.00 |
| Epon 828 | 0.75 |
| Acrawax C | 0.50 |
| Sodium Benzoate | 0.20 |
| AC617A | 3.00 |
| Notched Izod (Ft-lb/in) | 1.9 |
| Unnotched Izod (Ft-lb/in) | 8.2 |

In order to determine the relative rate of crystallization of the compositions of Examples 1-8, Differential Scanning Calorimetry (DSC) is used to record the difference between the peak melting temperature of the compound and peak crystallization temperature.

The determination procedure is conducted as follows. Pellets of the composition are ground up to a fine particle size and approximately 5 mg of the resultant material is loaded into an aluminum pan and press closed. The pan is heated in a DuPont 990 Thermal Analyzer under nitrogen from room temperature to 285°-290° C. at 40° C./min. The temperature is held at 290° C. for 5 minutes and the aluminum pan pressed to insure good material contact. The sample is then cooled at 20° C./min. to 50° C. or less. It is then heated again under nitrogen at 20° C./min. to the melting point. As soon as base line is regained, cooling is begun at 20° C./min. A thermogram is generated during the latter heating and cooling cycle which records the melting temperature range of the compound as it is heated and the crystallization temperature range as the sample is cooled. The difference between the peak melting temperature and the peak crystallization temperature is a measure of how rapidly a sample begins to recrystallize after melt. The smaller the difference ($\Delta T$), the more desirable the compound is as an injection molding resin. As a point of reference, unmodified 0.59 IV polyethylene terephthalate resin exhibits a $\Delta T$ of 60° thus any value below 60° C. represents an enhancement of the crystallization rate.

The results of the determination procedure are set out in Table VI below.

TABLE VI

| Composition of Example No. | DSC $\Delta T$ (°C.) |
| --- | --- |
| 1 | 41 |
| 2 | 52 |
| 3 | 41 |
| 4 | 40 |
| 5 | 42 |
| 6 | 41 |
| 7 | 43 |
| 8 | 41 |

We claim:
1. A composition consisting essentially of polyethylene terephthalate, sodium benzoate and a poly-alpha-olefin.
2. A composition according to claim 1 wherein the poly-alpha-olefin is low density polyethylene.
3. A composition according to claim 1 wherein the poly-alpha-olefin is polypropylene.

4. A composition consisting essentially of polyethylene terephthalate, sodium benzoate, a poly-alpha-olefin and fiberglass.

5. A composition according to claim 4 wherein the proportion of sodium benzoate to the total composition is from about 0.05% to about 0.5%, and the proportion of poly-alpha-olefin to the total composition is from about 1.5% to about 4.0%.

6. A composition according to claim 4 wherein the proportion of sodium benzoate to the total composition is from about 0.1% to about 0.3%, and the proportion of poly-alpha-olefin to the total composition is from about 2.0% to about 3.5%.

7. A composition according to claim 5 wherein the poly-alpha-olefin is low density polyethylene.

8. A composition according to claim 5 wherein the poly-alpha-olefin is polypropylene.

9. A composition according to claim 6 wherein a flame retardant additive is present.

10. A composition according to claim 6 wherein an impact modifier is present.

11. A composition according to claim 5 wherein the poly-alpha-olefin is selected from the group consisting of polyethylene, polypropylene, poly 1-butene, linear low density polyethylene and low molecular weight polyethylene wax.

12. A composition according to claim 11 in which there is also present an epoxy resin.

* * * * *